United States Patent [19]

Lippert

[11] Patent Number: 4,702,333

[45] Date of Patent: Oct. 27, 1987

[54] STEERING APPARATUS FOR MOTOR VEHICLES

[75] Inventor: Reinhold Lippert, Kirchheim, Fed. Rep. of Germany

[73] Assignee: Daimler-Benz Aktiengesellschaft, Stuttgart, Fed. Rep. of Germany

[21] Appl. No.: 757,945

[22] Filed: Jul. 23, 1985

[30] Foreign Application Priority Data

Jul. 24, 1984 [DE] Fed. Rep. of Germany ....... 3427160

[51] Int. Cl.$^4$ .............................................. B62D 5/06
[52] U.S. Cl. ..................................... 180/140; 92/131; 180/148; 280/91
[58] Field of Search ............... 180/140, 141, 142, 143, 180/147, 148, 79, 79.1; 280/91; 92/131, 7

[56] References Cited

U.S. PATENT DOCUMENTS

| | | | |
|---|---|---|---|
| 2,354,830 | 8/1944 | Reid | 280/91 |
| 3,227,238 | 1/1966 | Strader | 180/140 |
| 3,572,460 | 3/1971 | Berlich | 180/140 |
| 3,871,469 | 3/1975 | Millard et al. | 180/148 |
| 4,351,226 | 9/1982 | Cyrot | 92/131 X |
| 4,467,885 | 8/1984 | Furukawa et al. | 180/148 X |

FOREIGN PATENT DOCUMENTS

| | | |
|---|---|---|
| 2128491 | 12/1971 | Fed. Rep. of Germany . |
| 2052085 | 4/1972 | Fed. Rep. of Germany . |
| 2052090 | 4/1972 | Fed. Rep. of Germany . |
| 2707850 | 9/1977 | Fed. Rep. of Germany . |
| 3228181 | 3/1983 | Fed. Rep. of Germany . |

*Primary Examiner*—David M. Mitchell
*Assistant Examiner*—Mitchell J. Hill

[57] ABSTRACT

A steering apparatus for a motor vehicle has a steering gear connected to a first set of vehicle wheels, and a selectable auxiliary steering gear connected to a second set of wheels. The steering gear for the first wheel set is connected to a steering wheel and includes a hydraulic servo mechanism which provides steering assistance to the steering gear when the force required to turn the steering wheel exceeds a predetermined limit. A hydraulic pressure transmitting device is attached to the gear output of the steering gear and is hydraulically connected to the auxiliary steering gear. The pressure transmitting device transmits hydraulic pressure to the auxiliary steering gear, when auxiliary steering is selected, which varies in correspondence with movements of the gear output of the steering gear and which is independent of the pressure supplied to the hydraulic servo mechanism.

25 Claims, 4 Drawing Figures

STEERING APPARATUS FOR MOTOR VEHICLES

BACKGROUND AND SUMMARY OF INVENTION

This invention relates generally to a steering apparatus for a motor vehicle and, more particularly, to a steering apparatus having steering assist and auxiliary steering features.

In a known steering apparatus of this type (German Unexamined Published Patent Application No. 2,052,085), the steering gear and assisting servomechanism act in the customary manner upon the wheels of the front axle when the auxiliary steering system is switched off, whereas the auxiliary steering system for the wheels of the rear axle is locked hydraulically in the position for traveling straight ahead. In order to obtain all-wheel steering, the auxiliary steering system is switched on by means of a manually operated hydraulic valve in such a manner that the pressure chambers of its steering mechanism used for turning the wheels in the left direction are connected to the appropriate valve connection of the steering valve for a left turn, whereas the pressure chambers of the servomechanism of the steering gear used for a left turn are disconnected from the corresponding valve connection of the steering valve and connected to the pressure chambers of the steering mechanism of the auxiliary steering system which are used for turning in the right direction. Upon this conversion to all-wheel steering, there is no change in the connection of the pressure chambers of the servomechanism of the steering gear used for a right turn to the corresponding valve connection of the steering valve associated with a right turn. As a result of this circuit arrangement, unfavorable conditions are encountered during service with all-wheel steering during left rotation of the hand steering wheel, because the pressure pump which develops the working pressure is then connected exclusively to the steering mechanism of the auxiliary steering system, the pressure chambers of which are used for a right turn are now connected, via the pipe connection established by the manually operated valve, to the pressure chambers of the servomechanism of the steering gear for a left turn. Therefore, the full working pressure for the overall steering assistance for both vehicle axles appears in the steering mechanism of the auxiliary steering system, which is equally as undesirable as the abrupt switching of the pressure pump to the servomechanism of the steering gear when the hand steering wheel is rotated in the right direction. Lastly, due to the purely hydrostatic steering movement of the vehicle axle inherently cooperating with the steering gear from the steering mechanism of the other vehicle axle, the fixed association of the steering angles of the wheels on the vehicle axle with the steering gear to the turn angle of the hand steering wheel also ceases to exist.

The object of this invention is to provide a steering apparatus of the type discussed in which the above-enumerated disadvantages of known steering systems are eliminated.

This and other objects are attained in a steering apparatus which comprises a steering gear, with hydraulic servo assist, for steering the wheels of a first vehicle axle, and a selectable auxiliary steering arrangement which allows the wheels of a second axle to be selectively steered or locked in place for straight ahead travel. A hydraulic pressure transmitting device, which is mechanically connected to a gear output of the steering gear and hydraulically connected to the auxiliary steering arrangement, provides for transmitting hydraulic pressure to the auxiliary steering arrangement when auxiliary steering is selected. The hydraulic pressure transmitted corresponds with movements of the gear output of the steering gear and is independent of the hydraulic pressure supplied to the hydraulic servo device. In a preferred embodiment of the invention, the steering gear includes a first gear assembly which has a gear output connected directly to the wheels of a vehicle axle, and a second steering gear assembly which has a gear output connected to the hydraulic pressure transmitting device. In another preferred embodiment, the gear output of the second steering gear assembly may also be connected directly to the vehicle wheels. The hydraulic pressure supplied to the servo mechanism is preferably limited as a function of the hydraulic pressure transmitted to the auxiliary steering mechanism. This pressure is limited to a predetermined pressure value which may also be adjusted as a function of the hydraulic pressure transmitted to the auxiliary steering mechanism.

In a steering apparatus according to this invention, it is first of all advantageous that the force transmitting device of the hydraulic linkage can be connected at any desired point of the steering linkage connected to the gear output of the steering gear, for example, a steering-gear arm. It is also advantageous that the full pressure for the steering assistance to a plurality of vehicle axles does not appear in the steering mechanism of the auxiliary steering system. Any abrupt change of the connection of the pressure pump to a servo-mechanism of one vehicle axle or to a steering mechanism of another vehicle axle upon a change of the direction of rotation of the hand steering wheel is also avoided in the steering apparatus of the present invention, in which the force transmitting device ensures a fixed correspondence of the steering angles at the relevant vehicle axle with the turning angle of the hand steering wheel in both the main and the auxiliary steering systems.

The drawings illustrate two exemplary embodiments of a steering apparatus according to the present invention. In the drawings:

DETAILED DESCRIPTION OF THE DRAWINGS

Figure 1:
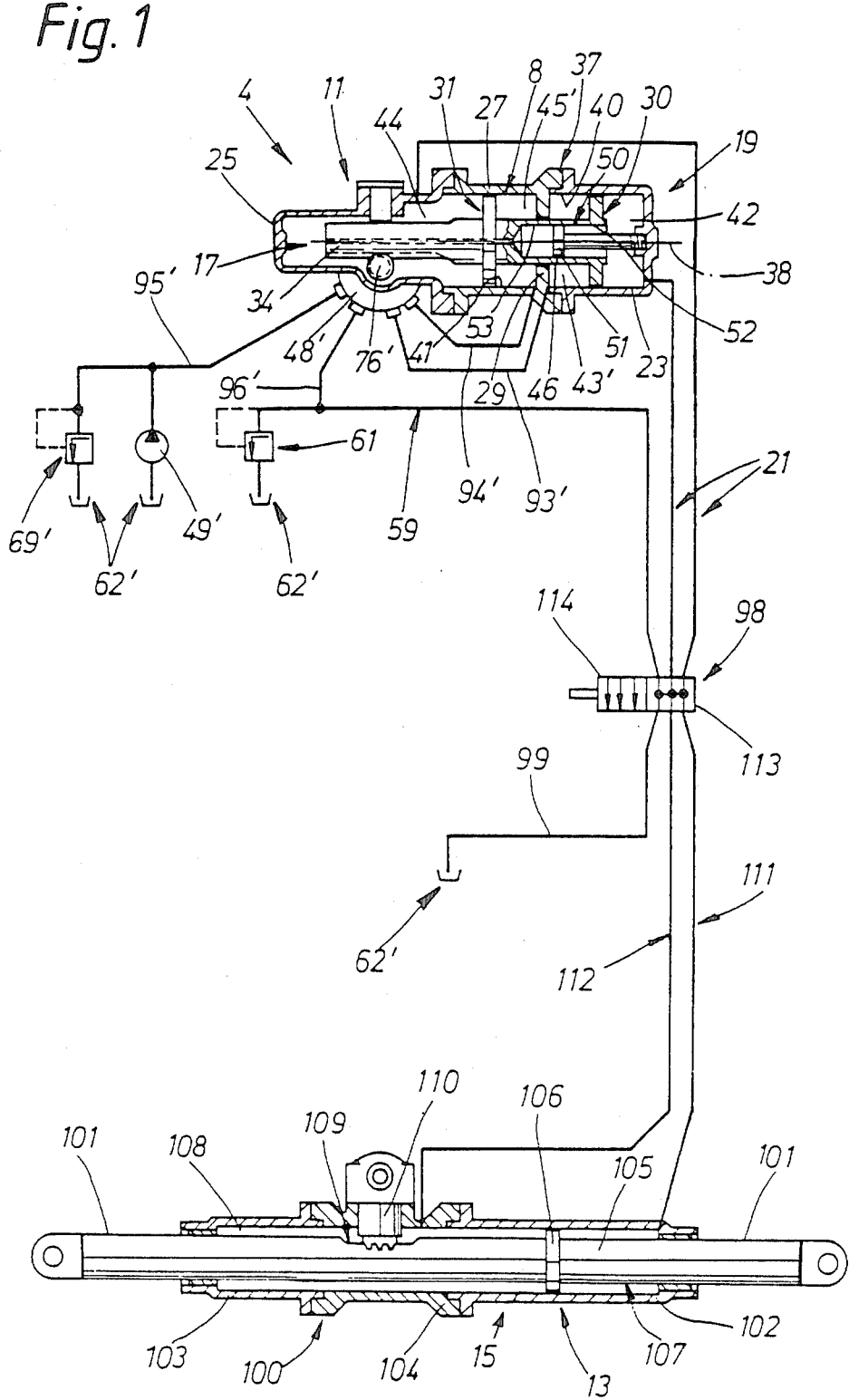
FIG. 1 shows part of a steering apparatus according to a first embodiment of the invention in which the gear output of a steering gear is coupled directly to the force transmitting motor.
Figure 2:
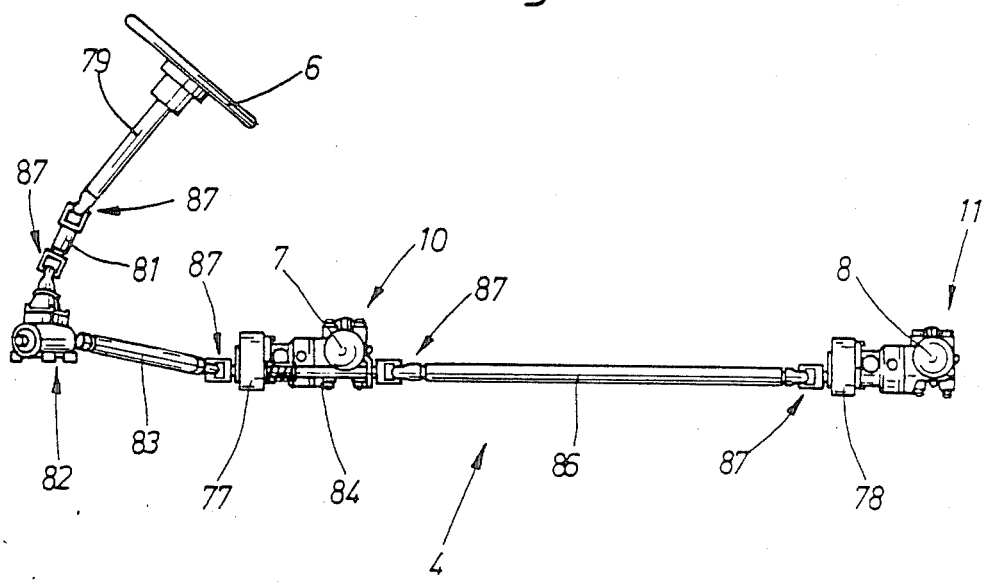
FIG. 2 shows the connection between the hand steering wheel and the two steering gears of the steering apparatus of FIG. 1.
Figure 2A:
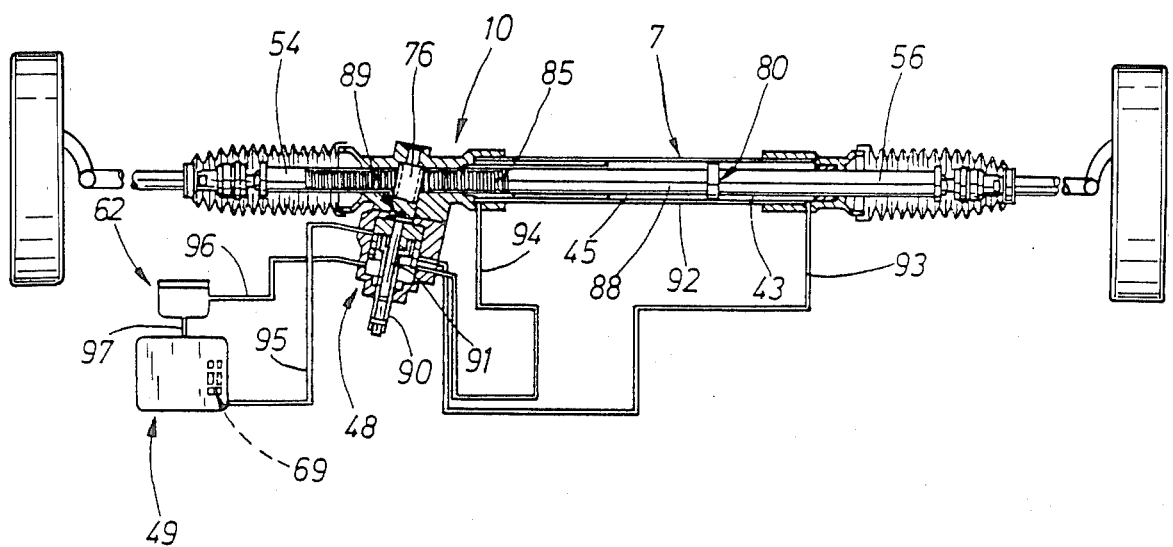
FIG. 2a shows the steering gear 10 and the associated servomotor 7 with steering valve 48 of the steering apparatus of FIG. 2.

In the steering apparatus 4 according to FIGS. 1, 2 and 2a, a steering control device such as hand steering wheel 6 is connected integrally in rotation to a steering shaft 79, which is in turn connected to a series of articulated shafts 81, 83, 84 and 86 which are used to operate two of steering gears 10 and 11. The articulated shafts are connected to each other and to the steering shaft 79 by universal joints 87, while a further articulating arrangement 82 is interposed between the universal joint 87 of the articulated shaft 81 and the articulated shaft 83 due to the angular orientation of these shafts. The articulated shaft 84 is connected to the steering gear 10 by an adaptor gear 77 in the form of a toothed wheel assembly. The articulated shaft 86 is likewise connected to the steering gear 11 via a similar adaptor assembly 78 with interposition of a universal joint 87. Whereas the input toothed wheel of the adaptor gear 77 is connected integrally in rotation to the articulated shaft 84, the output toothed wheel of the adaptor gear drives or is integrally connected to a primary side pinion shaft 90 (FIG. 2a). The pinion shaft 90—which forms the input member of the steering gear 10—is connected via a torsionally resilient bar 91 to a secondary side pinion shaft 89, which is rotatably connected to the toothed pinion 76 of the steering gear 10, which meshes in turn with a rack 85 which serves as the gear output of the steering gear. The rack 85—relative to the longitudinal axis of the vehicle—is connected at its left-hand end to a steering rod 54, which is coupled in customary manner via a steering rod train to the left vehicle wheel of a vehicle axle. The right end of rack 85 merges integrally into a piston rod 88 of a pressure medium servomechanism 7, which assists the steering force transmitted via toothed pinion 76. The piston rod 88 is rigidly connected to a piston 80 which subdivides an associated pressure cylinder 92 into two pressure chambers 43 and 45, which are connected, each via a pressure pipe 93 or 94, to a steering valve 48 disposed in the housing of the steering gear 10. The steering valve 48 is connected via a pump pressure pipe 95 to a pump 49, and via a return pipe 96 to a pressure medium reservoir 62. The suction side of pump 49 is connected, via a suction pipe 97, to reservoir 62. The maximum pressure in the pump pressure pipe 95 is adjusted by a pressure limiting valve 69. The steering valve 48 reacts to rotary angular displacements between the primary side and the secondary side drive pinion shafts 90 and 89, respectively, when the pretensioning force of the torsion bar 91 is overcome by the hand steering movement. Depending upon the turning direction of the hand steering wheel, the steering valve 48 connects the associated pressure chamber 43 or 45 to the pump 49 and the other pressure chamber to the return pipe 96. The piston rod 88 moves in the cylinder housing 92 axially outwards, its outer end being integrally connected to a steering rod 56 which is in turn coupled in the customary manner via a steering rod train to the right front wheel of the axle. The connections to the vehicle wheels are illustrated schematically in FIG. 2a and are omitted from FIGS. 1 and 3.

In the same manner as the drive pinion 76 of the steering gear 10 is in driving association, with interposition of a steering valve 48, with the hand steering wheel 6, the drive pinion 76′ of the steering gear 11 is also coupled operatively to the hand steering wheel with interposition of a steering valve 48′, via the adaptor gear 78, etc. However, the rack 34 meshing with the drive pinion 76′ of the steering gear 11 is used solely as a mechanical drive means for a hydraulic force transmitting device 19, which is connected by hydraulic connections 21 to a hydrostatic steering mechanism 15 of an auxiliary steering system 13. The structural configurations and kinematic relationship of steering gear 11 with pressurized medium servomechanism 8 and force transmitting device 19 is described below.

Two housing end parts 23 and 25 are each detachably connected by flanges to an end face of a housing central part 27 of a cylinder housing 37 which includes a housing partition wall 29. The housing partition wall 29 is penetrated by a piston rod 46 and creates two housing chambers 40 and 41, which are in turn respectively subdivided into two pressure chambers 42 and 43′, and 45′ and 44, respectively by double-acting pistons 30 and 31 which are rigidly connected to piston rod 46. The rack 34, which forms the gear output 17 of the steering gear 11 and meshes with the drive pinion 76′, is formed integrally with, or is rotatably connected to the piston rod 46. The piston rod 46 has a central cylindrical bore 50 which is engaged by a reducing piston 51 which moves integrally with the cylinder housing 37. The cylindrical bore 50 is subdivided by the reducing piston 51 into two bore sections 52 and 53, each of which is in open communication with the axially adjacent outer pressure chambers 42 and 44, respectively. The inner pressure chambers 43′ and 45′ are, in turn, each connected by respective pressure pipes 93′ and 94′ to the steering valve 48′, which is in turn connected by a return pipe 96′ to a pressure medium reservoir 62′ and by a pump pressure Pipe 95′ to a pump 49′. The mode of operation of the steering valve 48′ to adjust the pressure in the inner pressure chambers 43′ and 45′ is precisely the same as that of the steering valve 48 in FIG. 2a. A pressure limiting valve 69′, which adjusts the maximum value of the delivery pressure, is connected to the pump pressure pipe 95′. The return pipe 96′ of the steering valve 48′ is also connected to a return pipe 59 leading to a two-way hydraulic valve 98, while the connection of the return pipes 59 and 96′ to the pressure medium reservoir 62′ is effected via pressure resisting valve 61. On the other hand, an unthrottled return pipe 99 connects the two-position valve 98 to the reservoir 62′.

The steering mechanism 15 has a subdivided cylinder housing 100 with a housing central part 104 and two housing end parts 102 and 103 connected by flanges to its end faces. A piston rod 105 moves in the housing and has a piston 106 which subdivides the interior space of the cylinder housing into two pressure chambers 107 and 108. The hydraulic connection 21 consists substantially of a connecting pipe 111, which connects the outer work pressure chamber 44 of the force transmitting device 19 to pressure chamber 107 of steering mechanism 15, and of a connecting pipe 112 which connects the outer pressure chamber 42 of the force transmitting device 19 to pressure chamber 108 of the steering mechanism. The two-way valve 98, which is constructed as a 6/2-way valve, is interposed in the connecting pipes 111 and 112. This two-way valve has, as illustrated, a control position 113 in which the two connecting pipes 111 and 112 are connected to the return pipes 59 and 99, whereby an effective venting of the force transmitting device 19 and of the steering mechanism 15 is achieved. The two-way valve 98 is switchable into a second control position 114, in which the manual connection of the above-mentioned pipes is interrupted, and the return pipe 59 is connected to the return pipe 99, and the connecting pipes 111 and 112 are connected between the force transmitting device 19 and steering mechanism 15. In the position illustrated for straight ahead travel and with auxiliary steering system 13 switched off, the steering mechanism 15 is positively locked in the straight ahead position. For this purpose, piston rod 105 is provided with a rack section 109 which is engaged by a corresponding locking member 110 which is arranged in the housing central part 104. The ends of piston rod 105 outside the housing are formed as steering rods 101, to enable them to be coupled to the vehicle wheels of a rear axle by means of articulations and articulated linkages in the customary manner.

The steering valve has a so-called open "center" in its neutral position, whereby the pressure pipes 93' and 94' of the work pressure chambers 43' and 45' of the servomotor 8 are connected both to the pump pressure pipe 95' and also to the return pipe 96'.

The steering valve 48 of the servomechanism 7 (FIG. 2a) operates similarly, so that its pressure chambers 43 and 45 are connected to the pump pressure pipe 95 and return pipe 96 in the same manner.

In order to explain the operation of the system, it is first assumed that the two-way valve 98 is in the illustrated switched-off position 113 and that the auxiliary steering wheel 6 is operated in the right rotational direction. When the hand steering force exceeds and overcomes the pretensioning force of the spring torsion bar 91 of the steering valve 48 of the servomechanism 7, the steering valve 48 reacts so that a higher pressure is provided in the pressure chamber 45 than in the pressure chamber 43, so that a differential pressure force results at the piston rod 88, which assists the driving force of the toothed pinion 76 in the direction of the right turning of the vehicle wheels.

In the case of a left rotation of the hand steering wheel, an oppositely directed assistance in the direction of the left turning of the vehicle wheels is obtained in the form of a differential pressure force at the piston rod 88.

Under the circumstances described—i.e., two-way valve 98 is in switched-off position 113—force transmitting device 19 and steering motor 15 are unloaded, so that no operating force appears at the steering valve 48' of the servomechanism 8 to make the associated torsion bar and/or the steering valve 48' respond.

When the auxiliary steering system 13 is connected, the locking member 110 is moved out of engagement with the rack section 109, and each of the pipes 111 and 112 is connected in the hydraulic circuit. Consequently, each axial movement of rack 34 of steering gear 11 is accompanied by a corresponding movement of the piston rod 105 of steering mechanism 15, irrespective of whether the movement of rack 34 occurs with or without servo assistance.

Accordingly, if the outer steering moment at the vehicle axle connected to the auxiliary steering system 13 is so high that the steering valve 48' of the steering gear 11 reacts, then, in the manner described in connection with servomechanism 7, a higher pressure force is provided in the pressure chambers 43' or 45' of the servomechanism 8 associated with the relevant steering direction, so that a differential pressure force results at the piston rod 46, whereby the force transmitting device 19 is actuated and, necessarily therefore, the steering mechanism 15.

A more favorable surface area ratio with regard to the desired steering assistance, and one more suitable for the particular application, is obtained by the reducing piston 51 of the servomechanism 8.

The venting of the steering mechanism 15, located in the rear of the vehicle, in the switched-off position 113 of the two-way valve 98 is prevented by the pressure resisting valve 61 associated with steering valve 48'.

Figure 3:
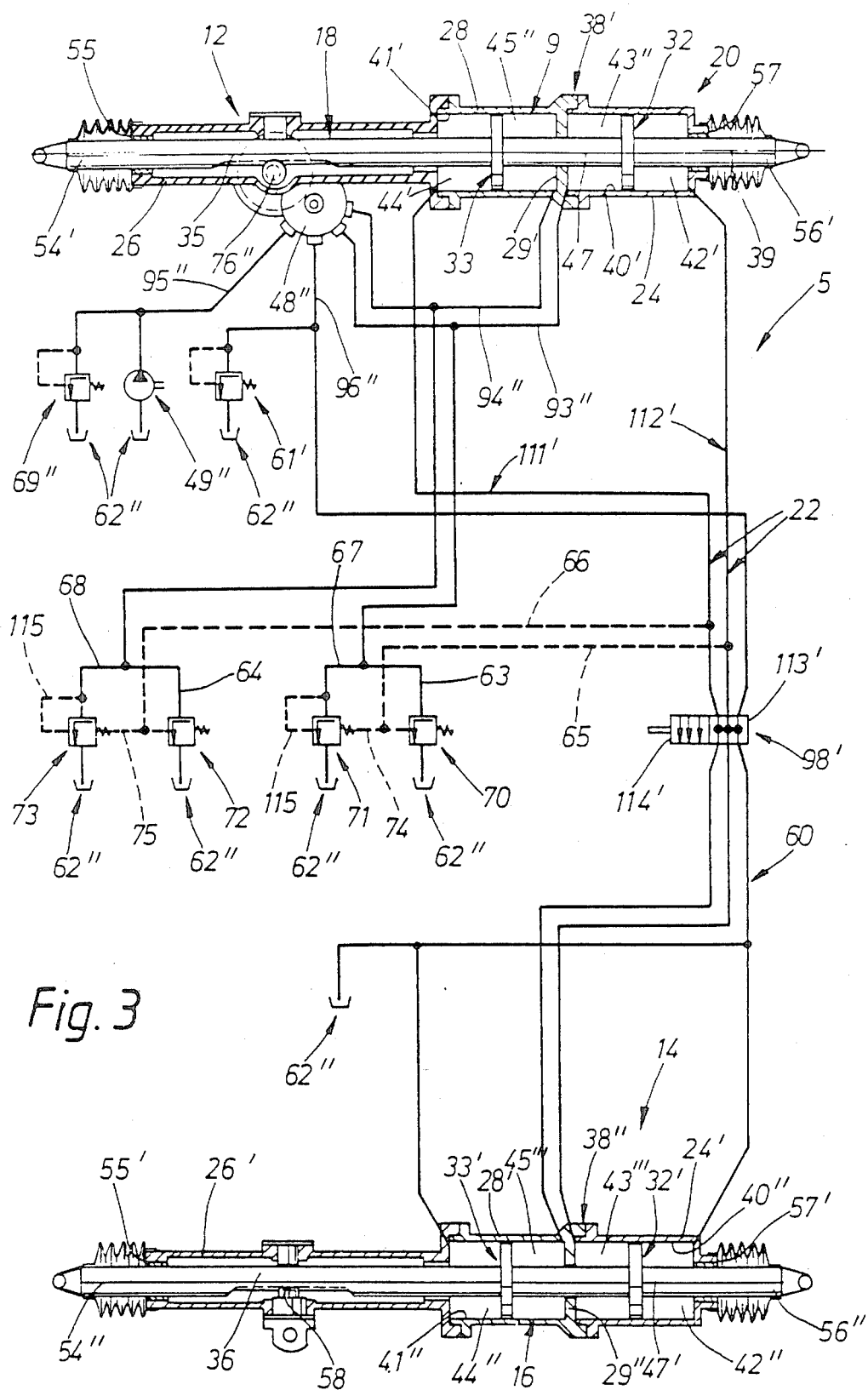
FIG. 3 shows a steering apparatus according to a second embodiment of the invention, in which a steering gear is coupled to both vehicle wheels and also to the force transmitting device.

In steering apparatus 4, as illustrated in FIGS. 1, 2 and 2a, a particular steering gear 11 which is not connected to the vehicle wheels is used for force transmitting device 19 of steering mechanism 15. In steering apparatus 5, as illustrated in FIG. 3, the hydraulic force transmitting device 20 is connected to steering mechanism 16 of auxiliary steering system 14 by hydraulic connections 22 and is integrally constructed with servomechanism 9 of a front axle steering gear 12 which is coupled to the vehicle wheels. The steering gear 12 likewise operates with a rack 35 as a gear output, which is constructed so as to move integrally with a coaxial piston rod 47. Rack and piston rod operate in a cylinder housing 38', which is subdivided into a housing central part 28 containing a housing partition wall 29', and two housing end parts 24 and 26 connected by flanges to the ends of the central part. The housing partition wall 29' subdivides the cylinder housing 38' into two housing chambers 40' and 41', which are in turn each subdivided into two pressure chambers 42' and 43", or 44' and 45", respectively, by double-acting pistons 32 and 33, respectively, which are rigidly connected to piston rod 47. Rack 35 and piston rod 47 pass through the associated housing end parts 24 and 26 to the outside, and have outer ends which are formed as steering rods 54' and 56', respectively, which are coupled to vehicle wheels of the front axle via steering linkages and articulations in the customary manner. The rack 35 forming the gear output 18 of the steering gear 12 meshes with a drive pinion 76", which is actuated from the hand steering wheel 6 with interposition of a steering valve 48"', as previously described with reference to drive pinion 76 of steering gear 10. The steering valve 48" of servomechanism 9 is likewise connected by work pressure pipes 93" and 94" to the inner pressure chambers 43" and 45", by a pump pressure pipe 95" to a pressure pump 49", and by a return pipe 96"—in which a pressure resisting valve 61' is included—to a pressure medium reservoir 62". The maximum pump pressure is adjusted by a pressure limiting valve 69" connected to the pump pressure pipe 95".

Steering mechanism 16 is of identical construction to servomechanism 9 of steering gear 12. Its cylinder housing 38" is accordingly subdivided into a housing central part 28' having a housing partition wall 29" and two housing end parts 24' and 26' connectable by flanges to the end faces thereof. The housing partition wall 29" forms two housing chambers 40" and 41", which are divided into pressure chambers 42" and 43"', and 44" and 45"', respectively, by double-acting pistons 32' and 33', respectively, which are rigidly connected to a piston rod 47' which penetrates partition wall 29". The piston rod is constructed so as to move integrally with rack 36 and passes through the housing end parts 24' and 26' at the outer end faces 55' and 57'—as also in the case of the servomechanism 9—and has outer ends which are constructed as steering rods 54" and 56", respectively. These steering rods 54" and 56" are, in turn, respectively coupled via steering rod linkages and articulations to an associated rear axle wheel of the vehicle.

The inner pressure chambers 43"' and 45"' of steering mechanism 16 are connected by connecting pipes 112' and 111', respectively, to the outer pressure chambers 42' and 44' of cylinder housing 38' of servomechanism 9. Pressure chambers 42' and 44'; and the associated piston surfaces of pistons 32 and 33, form the hydraulic force transmitting device 20, which is connected by the hydraulic connection 22, with the two connecting pipes 111' and 112', to steering mechanism 16. The return pipe 96" of steering valve 48" is connected by a return pipe 60 to the outer pressure chambers 42' and 44' of steering mechanism 16. Return pipe 60 and connecting pipes 111' and 112' pass through two-way valve 98' which is constructed as a 6/2-way valve and is manually movable between the switched-off position 113' illustrated and a control position 114'. In the switched-off position 113' of the two-way valve 98', all three pipes 111', 112' and 60 are again mutually connected, so that any venting of the rear positioned steering mechanism 16 when the auxiliary steering system 14 is switched-off is prevented. In the control position 114' of the two-way valve 98', the two connecting pipes 111' and 112' are connected, each individually as a hydraulic connection between force transmitting device 20 and steering mechanism 16, and the return pipe 60 is connected to the pressure medium reservoir at a point between two-way valve 98' and steering mechanism 16.

Whereas in the case of steering apparatus 4, as illustrated in FIGS. 1, 2, and 2a, the maximum pressure of servomechanism 7 of steering gear 10 and of servomechanism 8 of steering gear 11 is limited for each axle in that a particular pressure pump 49 or 49' with a particular pressure limiting valve 69 or 69' is associated with each steering gear, such a measure is impossible in steering apparatus 5, as shown in FIG. 3, because a common pressure pump 49" is used for the steering gear 12 of the front axle and for the steering mechanism 16 of a rear axle.

In the case of the steering apparatus 5 according to FIG. 3, the following arrangement is made to permit the pressure in servomechanism 9 to be limited to the additional steering load of the front axle, and also the pressure in the steering mechanism 16 to the additional steering load of the rear axle.

The two pressure pipes 93" and 94" of servomechanism 9 are connected, each via pressure pipes 63 and 67, and 64 and 68, respectively, to two pressure limiting valves 70 and 71, and 72 and 73, respectively. The two pressure limiting valves 70 and 71, associated with pressure pipe 93", are connected to a control pressure pipe 65. The pressure limiting valves 72 and 73, associated with pressure pipe 94", are connected to a control pressure pipe 66. The control pressure pipe 65 is connected to the connecting pipe 112', whereas the control pressure pipe 66 is connected to the connecting pipe 111'. The two pressure limiting valves 70 and 72 are respectively adjusted by spring force to the maximum working pressure of the steering mechanism 16, and open the relevant pressure pipes 63 and 64 to the pressurized medium reservoir 62" when this maximum value has been attained. The spring dimensions of the pressure limiting valves 71 and 73 are selected to correspond to the maximum value of the pressure in the servomechanism 9, and these valves open under the influence of a control pressure pipe 115 when this maximum value has been attained. However, since the steering load of both axles is added together at the steering rod or piston rod 47 of servomechanism 9, pressure limiting valves 71 and 73 are affected by corresponding control pressure pipes 74 and 75, which are respectively branched from the control pressure pipes 65 and 66, so that the maximum value of the pressure of the servomechanism 9 is increased at the relevant pressure limiting valve 71 and 73, respectively, in correspondence with the steering load of steering mechanism 16, but only until the maximum value of the pressure limiting valve 69" has been attained at the steering pump 49". Irrespective of this, however, the pressure of servomechanism 9 is limited by the respective pressure limiting valves 70 and 72 if the allowed maximum value of the pressure has been attained in the steering mechanism 16. In this case, the pressure in servomechanism 9 cannot be increased further and overloading of steering mechanism 16 is prevented.

The acceptable pressures in servomechanism 9 and in steering mechanism 16 may be mutually coordinated so that, for example, the pressure limiting valves 70 and 73 are each adjusted by spring power to approximately 50% of the pressure value which corresponds to the maximum pressure adjusted by the pressure limiting valve 69" associated with pressure pump 49".

With reference to steering mechanism 16, the arrangement is likewise made that the rack profile 36 is locked by a locking member 58 in the housing end part 26' when the auxiliary steering system is in a switched-off state in the position for travel straight ahead.

A preferred feature common to both steering apparatuses 4 and 5 is that a hydraulic force transmitting device 19 or 20 is used which is in strict kinematic association with the gear output 17 or 18 of steering gear 11 or 12, respectively, in order to ensure, via hydraulic connections 21 or 22 respectively, a precise kinematic correspondence of the steering angles adjusted by the auxiliary steering system 13 or 14 with the steering rotation of the hand steering wheel 6.

Although steering apparatuses for two axles are illustrated in both embodiments in the drawings, it is also possible for more than one axle to be controlled by an auxiliary steering system which is coupled by hydraulic linkage to a hydraulic force transmitting device. Thus, the spirit and scope of the present invention are to be limited only by the terms of the appended claims.

I claim:

1. A steering apparatus for a motor vehicle, comprising:
   steering gear means, connected to a steering control device and to the wheels of a first vehicle axis, for steering the wheels of said first axle;
   hydraulic servo means, connected to the steering gear means and to a source of hydraulic pressure, for assisting said gear means in steering the wheels of the first axle;
   selectable auxiliary steering means, connected to the wheels of a second vehicle axle, for steering the wheels of said second axle when auxiliary steering is selected, and means for locking the wheels in position for straight ahead travel when auxiliary steering is not selected; and
   hydraulic pressure transmitting means, hydraulically interconnecting a gear output of said steering gear means to the auxiliary steering means, for transmitting hydraulic pressure to the auxiliary steering means, when auxiliary steering is selected, in correspondence with movements of the gear output of the steering gear means, and wherein the auxiliary steering means is hydrostatically connected to the steering gear means by the hydraulic pressure transmitting means.

2. A steering apparatus according to claim 1, wherein the hydraulic servo means and the hydraulic pressure transmitting means include a plurality of hydraulic chambers and pistons, and wherein said plurality of chambers and pistons are co-axially arranged.

3. A steering apparatus according to claim 2, wherein said pistons are integrally connected for movement within said chambers.

4. A steering apparatus according to claim 3, wherein said gear output of said steering gear includes a rack integrally connected for movement with said pistons.

5. A steering apparatus according to claim 1, wherein the hydraulic servo means and the hydraulic pressure transmitting means comprise a cylinder housing which is subdivided by a housing partition into two pressure chambers, each of said chambers being further subdivided by a double acting piston into respective inner and outer chambers.

6. A steering apparatus according to claim 5, wherein said pistons are connected to a common piston rod which extends through the housing partition.

7. A steering apparatus according to claim 5, wherein said inner chambers are connected to a steering valve, and wherein said outer chambers are connected hydraulically to the auxiliary steering means.

8. A steering apparatus according to claim 1, wherein said steering gear means includes a cylinder housing which comprises a housing central part, having a housing partition therein, and two housing end parts which are connected by flanges to respective end faces of the housing central part.

9. A steering apparatus according to claim 8, wherein a rack is slidably disposed within one of the housing end parts.

10. A steering apparatus according to claim 1, wherein said steering gear means comprises a first steering gear assembly having a gear output connected to the wheels of a first vehicle axle, and a second steering gear assembly having a gear output connected to the hydraulic pressure transmitting means.

11. A steering apparatus according to claim 10, wherein each of said steering gear assemblies includes a steering valve and a hydraulic servo mechanism for providing steering assistance to the steering gear assembly, and wherein each steering valve is responsive to movements of the steering wheel to adjust the working pressure supplied to each servo mechanism.

12. A steering apparatus according to claim 11, wherein each of said steering valves is connected to a separate source of hydraulic pressure.

13. A steering apparatus according to claim 10, wherein said second steering gear assembly includes a cylinder housing which comprises a central part and two end parts attached by flanges to respective end faces of the central part and wherein the end parts are of a closed construction.

14. A steering apparatus according to claim 13, wherein said cylinder housing is subdivided by a housing partition into two pressure chambers, each of said chambers being further subdivided by a double acting piston into respective inner and outer chambers.

15. A steering apparatus according to claim 14, wherein said gear output of said second steering gear assembly includes a rack which is integrally connected for movement with said double-acting pistons.

16. A steering apparatus according to claim 14, wherein said double acting pistons are connected to a piston rod, and wherein said piston rod has a cylindrical bore extending axially from one end thereof, and wherein a reducing piston which is integrally connected to one of said end parts engages and subdivides said cylindrical bore into two bore sections which communicate, respectively, with the adjacent outer chambers of the housing.

17. A steering apparatus according to claim 4, wherein a first end of said rack is integrally connected to a first steering rod which extends through an outer face of a housing end part of said steering gear means.

18. A steering apparatus according to claim 17, wherein a second end of said rack is integrally connected to a second steering rod wnich extends through an outer end face of a second housing end part of said steering gear means.

19. A steering apparatus according to claim 1, wherein said auxiliary steering means includes a rack which is integrally connected on either end to respective steering rods, and wherein said rack cooperates with a locking member to lock the associated wheels in position for straight ahead travel.

20. A steering apparatus according to claim 6, wherein said auxiliary steering means includes a housing, a pair of double acting pistons and a piston rod, and wherein said auxiliary steering means comprises a cylinder housing which is subdivided by a housing partition into two pressure chambers, each· of said chambers being further subdivided by a double acting piston into respective inner and outer chambers, and wherein the inner pressure chambers of the auxiliary steering means are hydraulically connected to the hydraulic pressure transmitting means and wherein the outer pressure chambers of the auxiliary steering means are hydraulically vented.

21. A steering apparatus according to claim 20, wherein said outer pressure chambers of the auxiliary steering means are connected by a return pipe to a hydraulic reservoir.

22. A steering apparatus according to claim 20, wherein the return pipe is further connected to a steering valve and to a pressure resisting valve which is connected to a hydraulic reservoir.

23. A steering apparatus according to claim 1, further comprising means for limiting the hydraulic pressure supplied to the hydraulic servo means as a function of the hydraulic pressure transmitted to the auxiliary steering means.

24. A steering apparatus according to claim 23, further comprising means for limiting the hydraulic pressure supplied to the hydraulic servo means to a predetermined pressure value, relative to a regulated pressure value of the hydraulic pressure source.

25. A steering apparatus according to claim 24, wherein said predetermined pressure value is adjustable, to values equal to or smaller than the regulated pressure of the hydraulic pressure source, as a function of the hydraulic pressure transmitted to the auxiliary steering means.

* * * * *